(12) United States Patent
Frizzell

(10) Patent No.: US 9,106,069 B2
(45) Date of Patent: Aug. 11, 2015

(54) CABLE RETAINING APPARATUS

(71) Applicant: Lee Frizzell, Cramlington (GB)

(72) Inventor: Lee Frizzell, Cramlington (GB)

(73) Assignee: CMP Products Limited, Cramlington (GB)

( * ) Notice: Subject to any disclaimer, the term of this patent is extended or adjusted under 35 U.S.C. 154(b) by 0 days.

(21) Appl. No.: 14/342,894

(22) PCT Filed: Sep. 17, 2012

(86) PCT No.: PCT/EP2012/068273

§ 371 (c)(1),
(2) Date: Mar. 5, 2014

(87) PCT Pub. No.: WO2013/038018

PCT Pub. Date: Mar. 21, 2013

(65) Prior Publication Data

US 2014/0224946 A1    Aug. 14, 2014

(30) Foreign Application Priority Data

Sep. 16, 2011 (EP) ..................... 11181644

(51) Int. Cl.
| | |
|---|---|
| *F16L 3/08* | (2006.01) |
| *H02G 3/32* | (2006.01) |
| *H02G 3/30* | (2006.01) |
| *F16L 3/10* | (2006.01) |

(52) U.S. Cl.
CPC ............... *H02G 3/32* (2013.01); *F16L 3/1075* (2013.01); *H02G 3/30* (2013.01)

(58) Field of Classification Search
CPC combination set(s) only.
See application file for complete search history.

(56) References Cited

U.S. PATENT DOCUMENTS

| | | | |
|---|---|---|---|
| 6,726,166 B2 * | 4/2004 | Goodman | 248/229.14 |
| 6,892,990 B2 * | 5/2005 | Pisczak | 248/74.4 |
| 7,861,982 B1 * | 1/2011 | McClure | 248/74.1 |
| 8,500,073 B2 * | 8/2013 | Quesnel | 248/74.4 |
| 2008/0072399 A1 | 3/2008 | Krajenke et al. | |

FOREIGN PATENT DOCUMENTS

| | | |
|---|---|---|
| DE | 101 21 568 A1 | 11/2002 |
| GB | 2 361 029 A | 10/2001 |
| JP | 11 230421 A | 8/1999 |

OTHER PUBLICATIONS

International Search Report and Written Opinion under date of Jan. 30, 2013 in connection with PCT/EP2012/068273.

\* cited by examiner

*Primary Examiner* — Monica Millner
(74) *Attorney, Agent, or Firm* — Quarles & Brady LLP

(57) ABSTRACT

A cable retaining apparatus for holding high voltage cables is disclosed. The apparatus has a pair of cable retaining members that are hingedly connected to each other and engage around one or more cables. A clamping device connects the ends of the retaining members that are not hinged together thereby clamping the apparatus around the cables. The hinge that connects the retaining members together is adjustable to vary the position of the hinging axis allowing the apparatus to be used over a variety of sizes of cables.

7 Claims, 5 Drawing Sheets

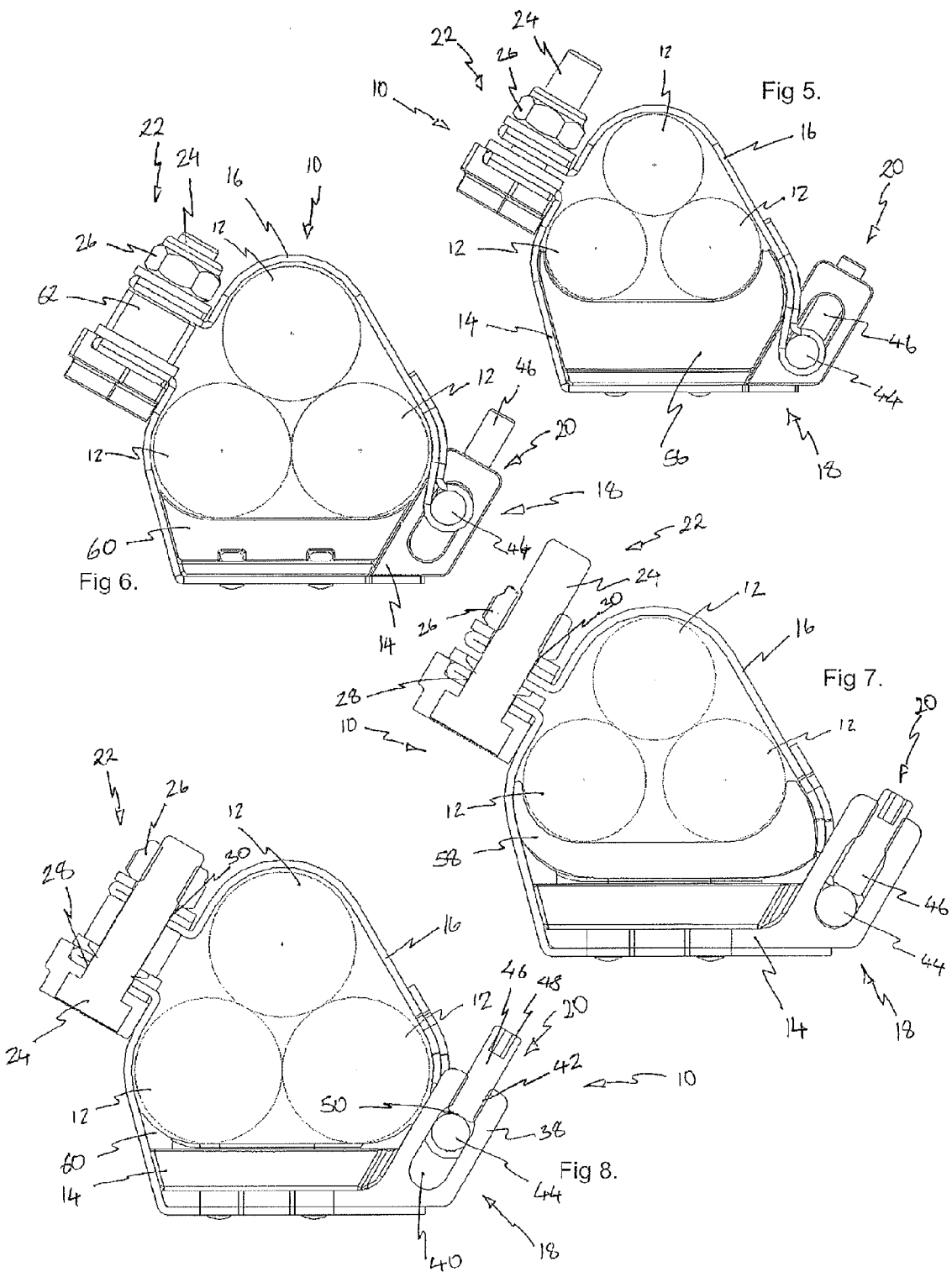

Fig 9.
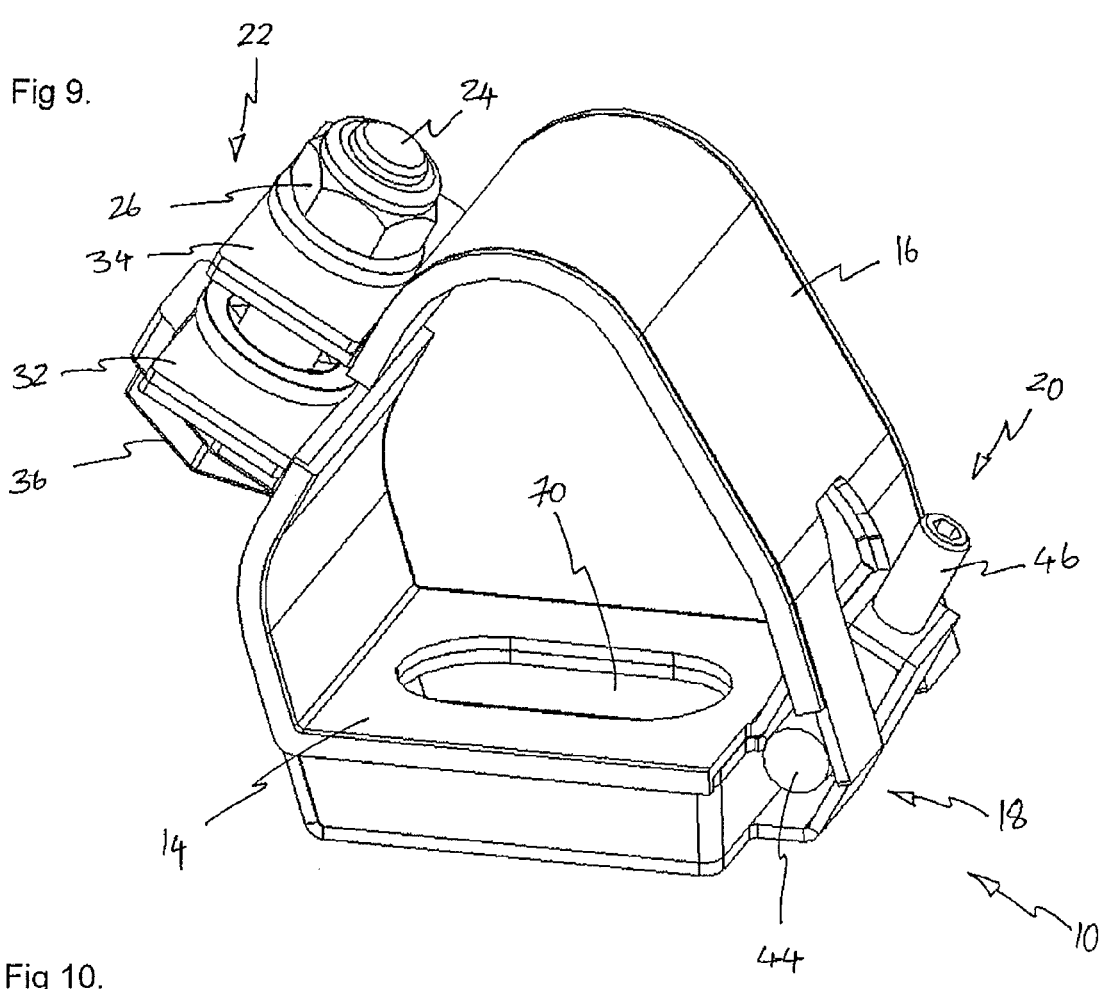
Fig 10.
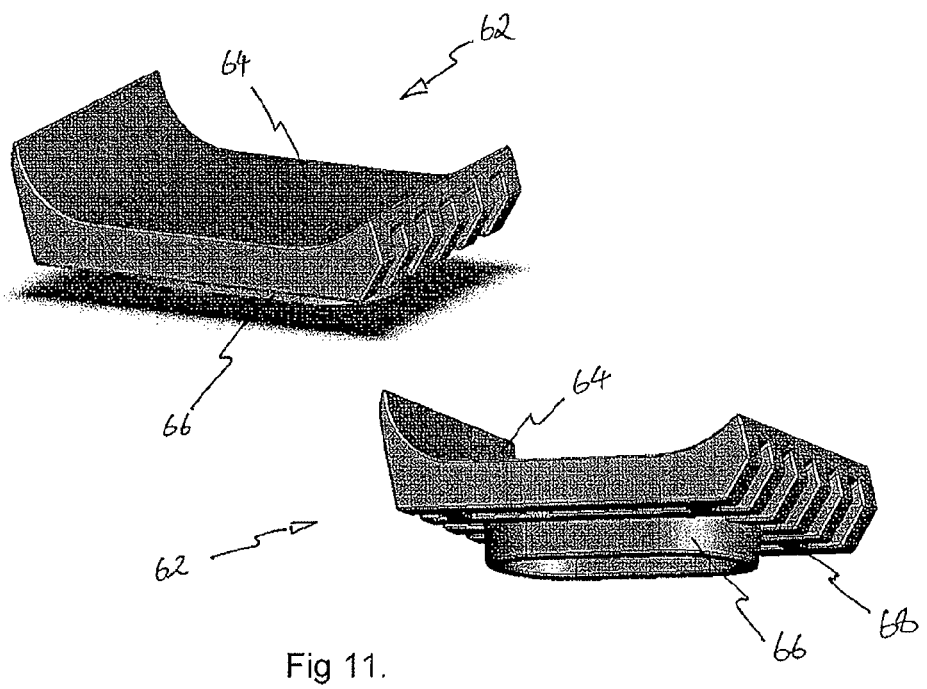
Fig 11.

CABLE RETAINING APPARATUS

CROSS-REFERENCE TO RELATED APPLICATIONS

This application represents the national stage entry of PCT International Application No. PCT/EP2012/068273 filed Sep. 17, 2012, which claims priority to European Patent Application 111816443 filed Sep. 16, 2011, the disclosures of which are hereby incorporated by reference in their entirety for all purposes.

The present invention relates to a cable retaining apparatus and relates particularly, but not exclusively, to a cleat for holding three high voltage sheathed electrical cables used in three phased power distribution.

In three phased power transmission cables, if a short circuit occurs between any of the cables, the electromechanical force set up between the cables causes a sudden, large movement of the cables in opposite directions. At the high voltages of power distribution cables, this is extremely dangerous, with potential to cause injury to personnel and damage to the cables and surrounding equipment.

As a result, it is known to use cable cleats in order to hold the three cables together. This is particularly the case where the cables are attached to a wall and regularly spaced strong cleats are used to hold the cables together in the event of a short circuit.

An example of the prior art has a triangular frame that is divided into two hingedly connected parts. At the opposite ends of these parts to the hinge, a nut and bolt extend through holes and clamp the cleat with the three cables therebetween.

Such cleats have the disadvantage that they are designed to work with a single size of cable. Furthermore, there is very little tolerance built into the cleat to accommodate variation in the cable diameter along the length of the three cables. As a result cable can be incorrectly, and therefore unsafely, held.

Preferred embodiments of the present invention seek to overcome the above described disadvantages of the prior art.

According to the present invention, there is provided a cable retaining apparatus for retaining at least one cable, the apparatus comprising:

at least one first cable retaining member adapted to engage a portion of at least one cable;
at least one second cable retaining member adapted to engage another portion of said at least one cable or a portion of at least one further cable, wherein said first and second retaining members are hingedly connected to each other by pivot means;
clamping means for pulling said first and second retaining members into clamping engagement with the or each cable;
said first member further comprising hinging axis variation means for varying the position of an axis about which said first and second retaining members pivot on the first cable retaining member.

By hingedly connecting the first and second retaining members using a hinge from which the position of the axis about which the members pivot can be changed provides the advantage that a single cleat of the type of this invention can be used on a wide variety of cables of different diameters. In apparatus of the prior art, a cable cleat of this type was designed for use with a single size of cable and could not be readily adapted to work with any other sized cables. Furthermore, because cables can vary in their diameter along their length and since these cable cleats are most commonly used where three high voltage cables are used together, there is potential for a significant variation in the overall size of the three cables together that are to be retained. Cable cleats of the prior art may be unable to properly retain and grip the cables along their entire length.

In a preferred embodiment the hinging point variation means comprises:

at least one hinge body having at least one slotted aperture extending therethrough for receiving at least one pivot axle, defining said axis, attached to said second retaining member said pivot axle adapted to move in said slot in a direction perpendicular to said axis; and
at least one limiter for limiting the movement of said axle within said slotted aperture.

By providing one, or preferably a pair of, slotted apertures into which the hinging axle together with a limiter to limit the axle's ability to move within the slots, provides the advantage that a simple and robust mechanism for varying the axle position is provided. Furthermore, this mechanism allows the position of the axle to be set even after the first and second retaining members are in position. For example, the cables can be placed within the cable cleat with the axle in its position that allows the largest size of cables to be used. The clamping means is closed and locked using the nut and bolt provided and then the limiter is used to apply a suitable level of grip to the cable.

In another preferred embodiment the limiter comprises at least one threaded member adapted to engage a receiving threaded portion of said hinge body, an end of said hinge body limiting the movement of the pivot axle within said slotted aperture.

Using a threaded member to control the position of the limiter provides a simple and mechanically secure mechanism to allow the above described positioning of the pivot axle.

In a further preferred embodiment the clamping means comprises at least one nut and bolt.

The apparatus may further comprise insert portion adapted to be attached to said first and/or second retaining member between a surface of said retaining portion that engages said cable and a surface of the cable.

The insert portion may comprise a body for reducing the space between the first and second retaining portions.

By including an insert portion that attaches to the first or second retaining member, the advantage is provided that the cable cleat of the present invention can operate with an even wider range of cable diameters. The use of an insert also allows the profile of the surface that the cables engage to be modified to suit the smaller cable diameter thereby ensuring that two much pressure is not applied to the cables. The insert portion also improves the lateral grip between the apparatus and the cable.

Alternatively the insert portion may comprise a liner for locating between said first and second retaining members and the cable.

By using a liner between the retaining portion and the cables the lateral grip between the cables and apparatus is improved.

In a preferred embodiment the apparatus is adapted to engage three cables arranged in a triangle.

In another preferred embodiment the first retaining portion is adapted to engage a single cable and said second retaining member is adapted to engage two other cables.

Preferred embodiments of the present invention will now be described, by way of example only, and not in any limitative sense, with reference to the accompanying drawings in which.

Figure 12:
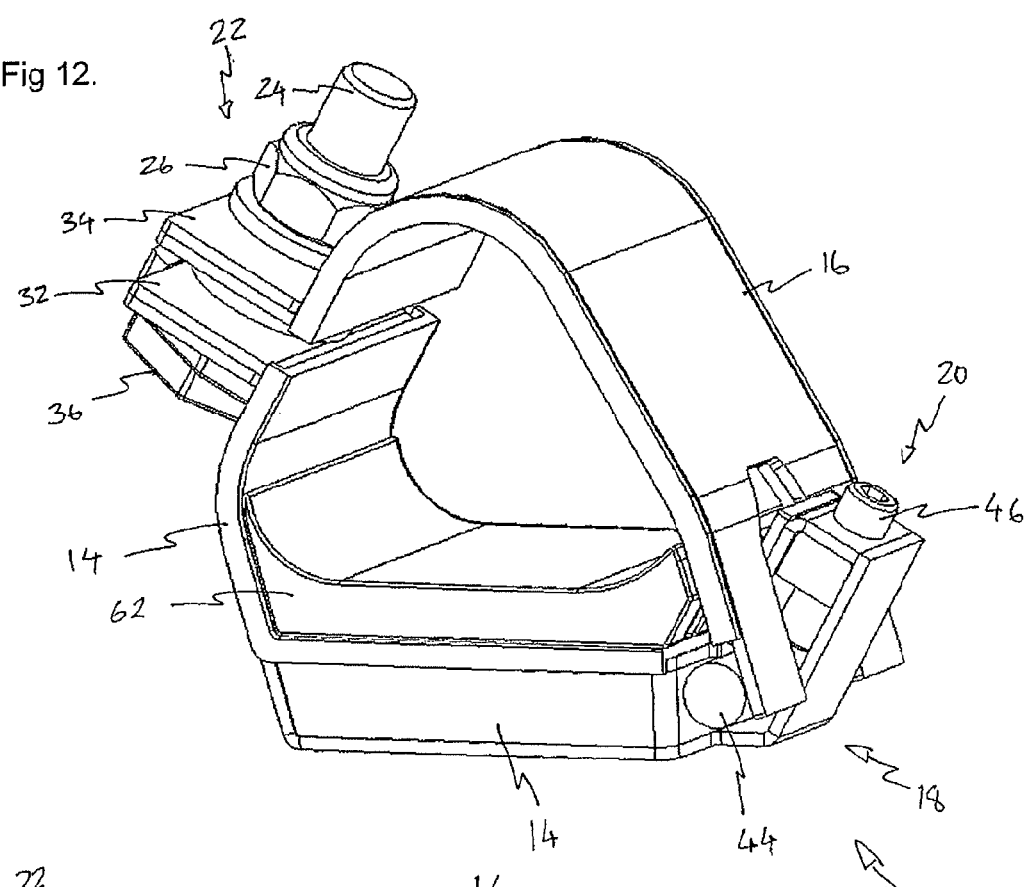
Figure 13:
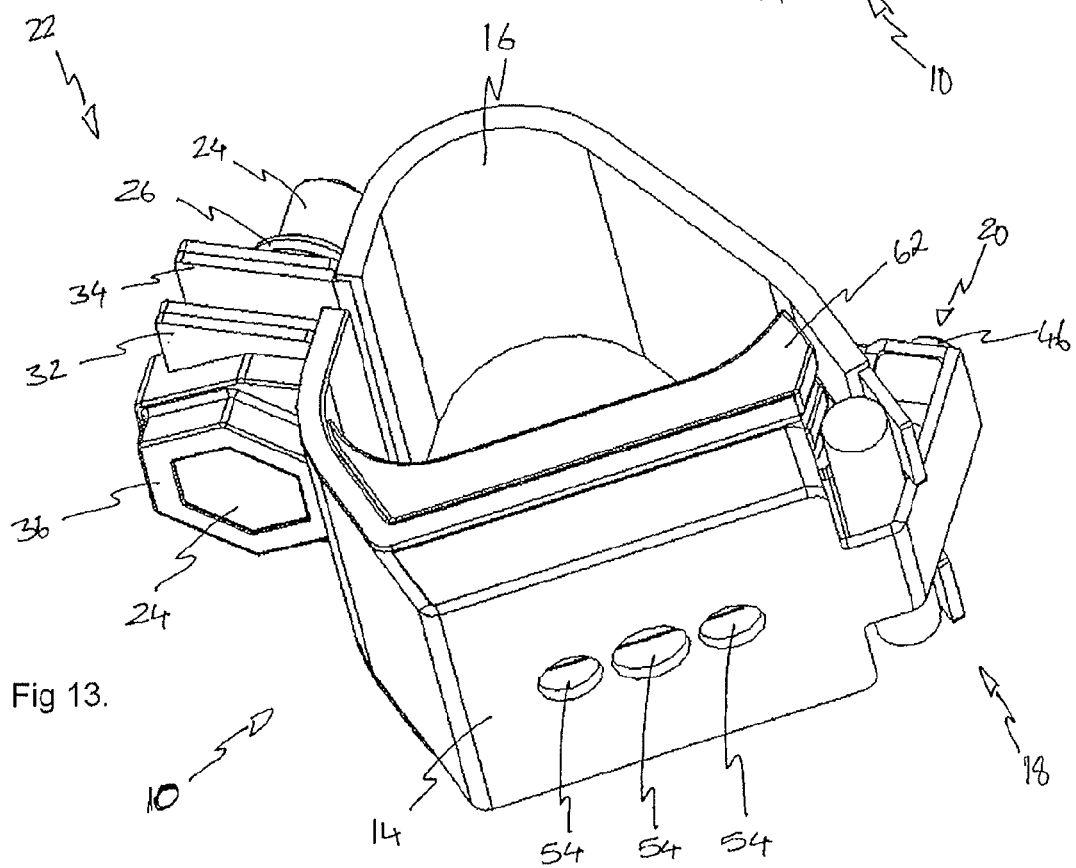

FIGS. 5, 6, 7 and 8 are side views (with 7 and 8 being sectional side views and FIG. 7 being a sectional view of FIG. 6) of the apparatus of FIGS. 1 to 4 in use with different sizes of cables;

FIG. 9 is a perspective view of an alternative embodiment of the apparatus of the present invention;

FIGS. 10 and 11 are perspective views of alternative additional components used in conjunction with the apparatus of FIG. 9;

FIGS. 12 and 13 are perspective views, from above and below, of the apparatus of FIG. 9 in conjunction with the additional components of FIGS. 10 and 11.

Referring to the figures, a cable retaining apparatus or cable cleat 10 for retaining at least one, and typically three cables 12, has first and second cable retaining members 14 and 16. Both cable retaining members are adapted to engage portions of the cables and the cable retaining members 14 and 16 are hingedly connected to each other by a pivot means in the form of hinge 18. The first cable retaining member 14 has a hinge axis variation means 20 that forms part of the hinge 18 and allows the position of the axis about which the first and second retaining members pivot to be varied. Clamping means 22 pulls the first and second retaining members into clamping engagement with the or each cable. The clamping means 22 is formed from a bolt 24 and nut 26 that extend through apertures 28 and 30 in flanges 32 and 34 that are formed in the first and second cable retaining members 14 and 16. A bolt head cover 36 is used to cover the head of bolt 24 and this engages first cable retaining member so as to prevent rotation of the bolt 24.

Hinge axis variation means 20 is formed from a hinge body 38 that has a slotted aperture 40 extending therethrough. A threaded aperture 42 also extends through hinge body 38 and into slotted aperture 40. A hinge axle 44 that is formed as part of second cable retaining member 16 extends through slotted aperture 40. A hinge axle limiter 46 is a threaded member that extends through threaded aperture 42. A first end 48 of hinge axle limiter 46 has a tool engaging portion that engages an alien key to cause rotation of the hinge axle limiter within the threaded aperture, by co-operation of their respective threaded surfaces. This therefore allows the extent to which the hinge axle limiter extends through the threaded aperture 42 to be varied. A second end 50 of hinge axle limiter 46 engages hinge axle 44.

First cable retaining member 14 has a base portion 52 that contains fixing apertures 54 for fixing cable cleat 10 to a surface. Insert portions 56, 58 and 60 are inserted to provide support for various sizes of cable 12.

Figure 1:
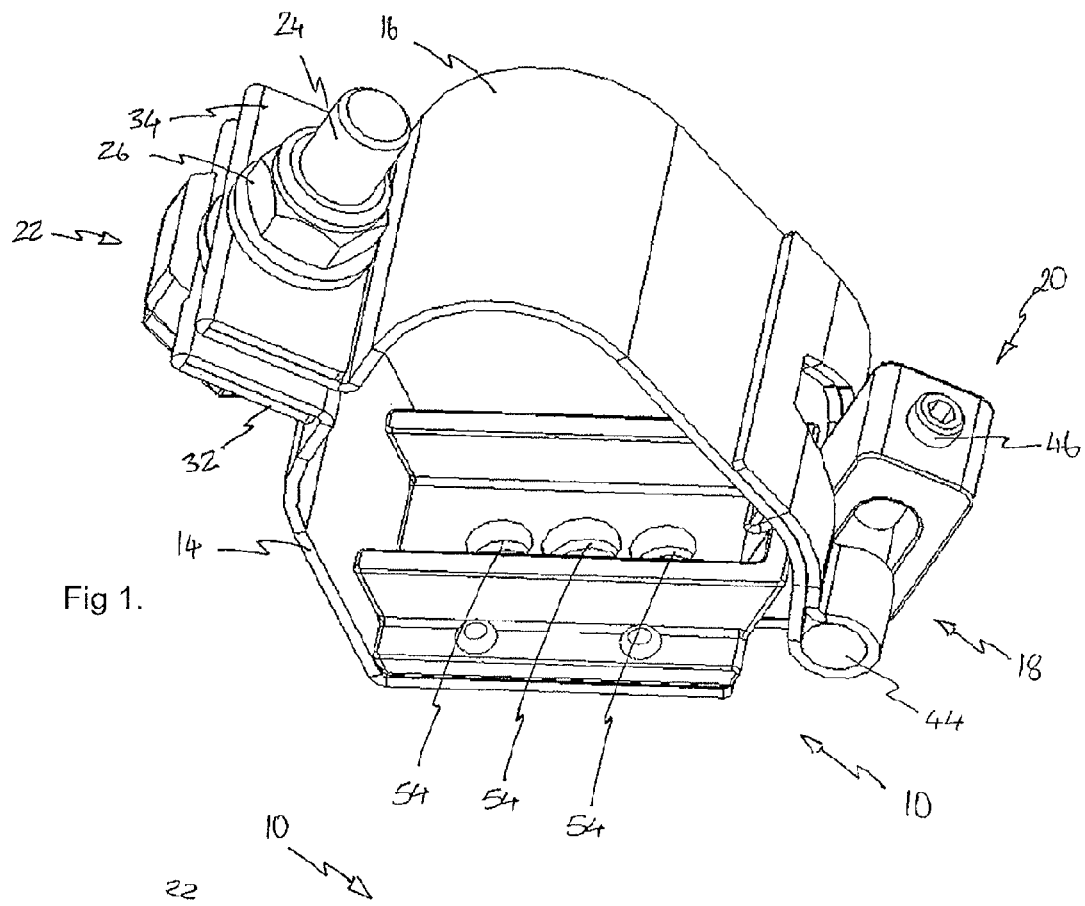
FIG. 1 is a perspective view from above of an apparatus of the present invention.
Figure 2:
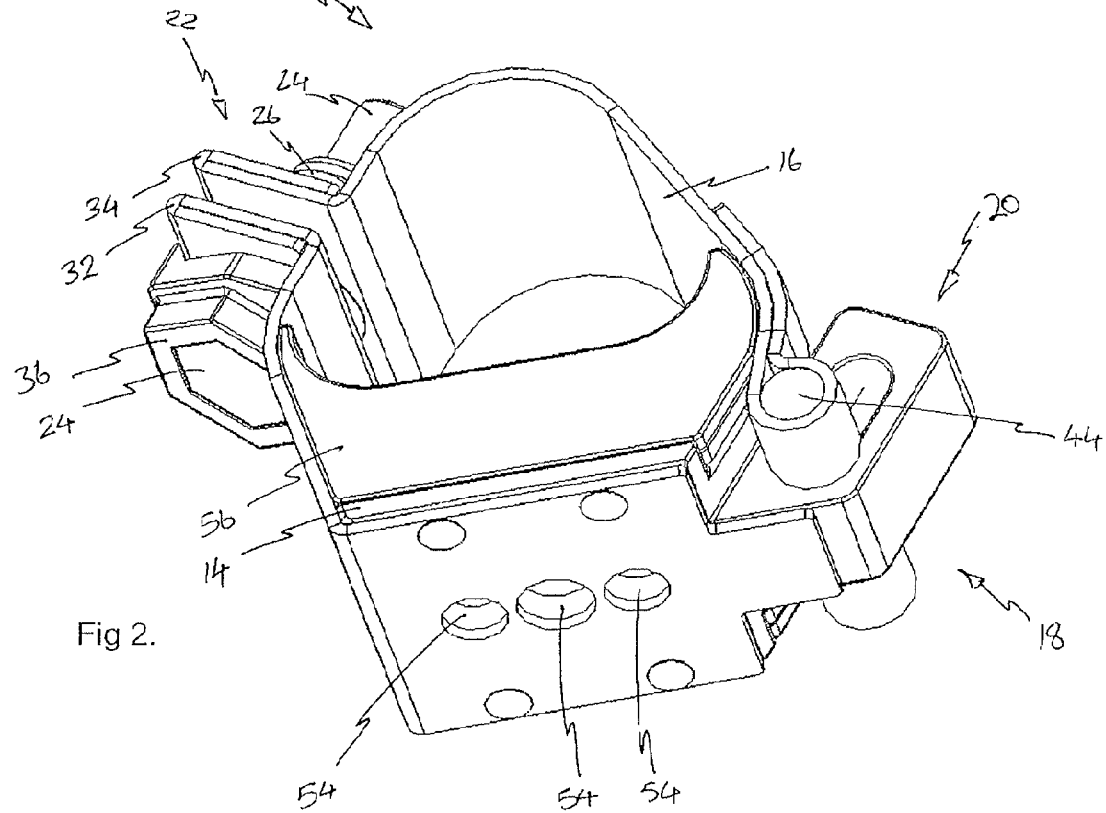
FIG. 2 is a perspective view from below of the apparatus of FIG. 1 including an additional component.
Figure 3:
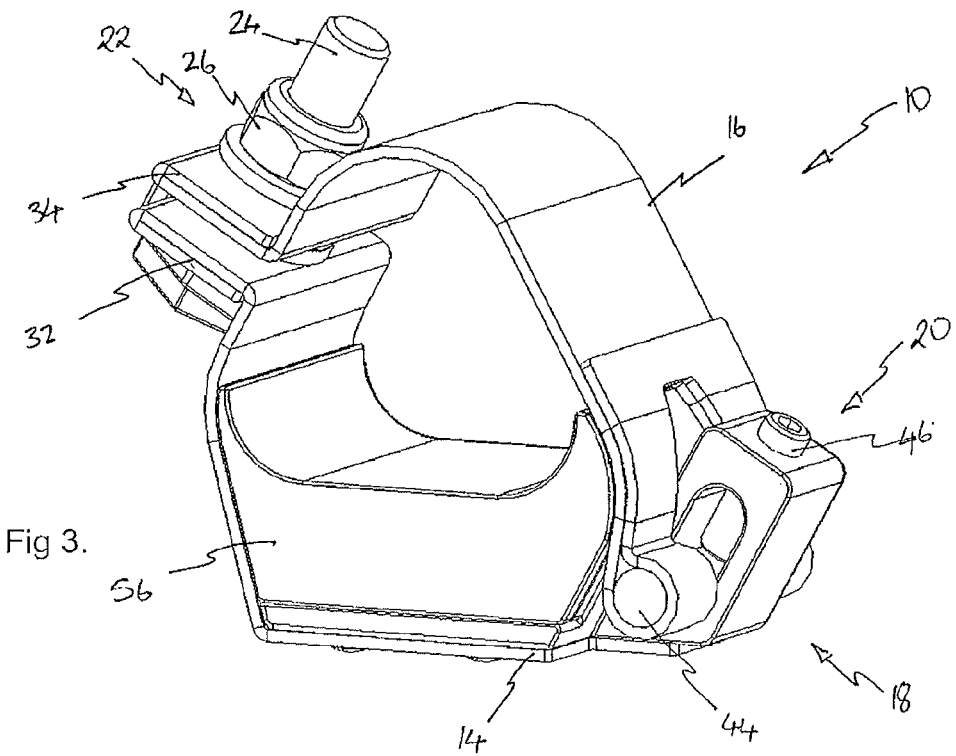
FIG. 3 is a perspective view from the side of the apparatus of FIG. 2.
Figure 4:
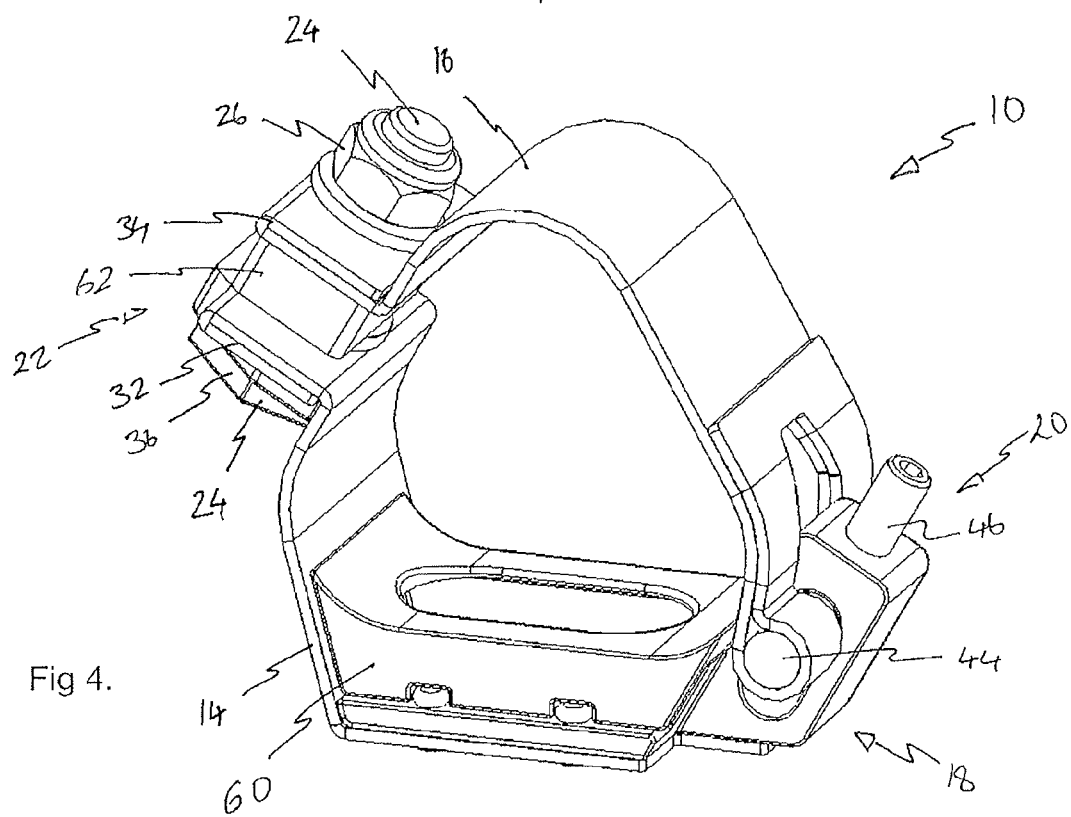
FIG. 4 is a perspective view similar to that of FIG. 3 but including an alternative additional component.

Use of the cable cleat 10 will now be described. The cable cleat 10, as shown in FIG. 1, has an insert 56, 58 or 60 added to it, as shown in the remaining figures. The size of insert used depends on the size of the cables that the cleat is to hold. For example, for the smallest size of cable the cleat 56, shown in FIGS. 2, 3 and 5, is used. For the largest diameter cable a smaller insert 60 is used as shown in FIGS. 4, 6 and 8. For cables sized between the largest and smallest, an intermediate insert 58 is used as shown in FIG. 7.

If it is already known from the size of cable that is being used what position the hinge axle 44 must be in to allow the first and second retaining members to retain the cables, then this can be set. For example, for the smallest size of cable, as seen in FIG. 5, the hinge axle 44 must be in its lowest position and therefore the hinge axle limiter 46 is rotated, using an alien key inserted into first end 48, so that the second end 50 holds hinge axle 44 at the lowermost end of slotted aperture 40. The clamping means is released by separating nut 26 from bolt 24 and the first and second cable retaining members are opened about hinge 18. The cables 12 are inserted and the flanges 32 and 34 brought back towards engagement with each other. Bolt 24 is inserted through apertures 28 and 30 and the nut 26 brought into threaded engagement with bolt 24. A spanner is used to tighten nut 26 so that a light pressure is applied to cables 12, thereby holding them in place.

Where the largest size of cable is used, the smallest insert 60 is added to cable cleat 10 as shown in FIGS. 4 and 6. In this instance, the hinge 18 must be in its largest position with the hinge axle limiter having its second end 50 at the uppermost end of slotted aperture 40. When the cables are inserted and the nut 26 and bolt 24 extend through apertures 28 and 30, a spacer 62 is also used.

If an intermediate size of cable is used, it may not be immediately apparent what the correct position for hinge axle limiter 46 is. In this instance, the appropriate insert, in the example shown in FIG. 4 insert 58, is added to first cable retaining member 14. The hinge axle limiter 48 is positioned so that its second axle end is furthest towards the upper end of slotted aperture 40 and the cables inserted. The bolt 24 and nut 26 are used to close the first and second cable retaining members 14 and 16 around the cables 12. The hinge axle limited 48 and nut 26 can then be adjusted to apply a suitable gripping force to the cables 12.

Referring to FIGS. 9 to 13, alternative embodiments are shown therein, including an insert 62, which has a cable engaging surface 64 and a retaining portion 66 extending from the surface 68 on the opposing side of insert 62 from cable engaging surface 64. The retaining portion 66 extends into and engages aperture 70 in first cable retaining member 14 to locate and fixing the insert 62 in position.

It will be appreciated by persons skilled in the art that the above embodiments have been described by way of example only and not in any limitative sense, and that the various alterations and modifications are possible without departure from the scope of the invention as defined by the appended claims. For example, a liner, located between the cable and the retaining portions, could be provided to improve the lateral grip between the retaining portions and cables and to decrease the likelihood of damage to the cable sheaths.

The invention claimed is:

1. A cable retaining apparatus for retaining at least one cable, the apparatus comprising:—
   - at least one first cable retaining member adapted to engage a portion of at least one cable;
   - at least one second cable retaining member adapted to engage another portion of said at least one cable or a portion of at least one further cable, wherein said first and second retaining members are hingedly connected to each other by at least one pivot device; and
   - at least one clamping device for pulling said first and second retaining members into clamping engagement with the or each cable;
   - said first member further comprising at least one hinging axis variation device for varying the position of an axis about which said first and second retaining members pivot on the first cable retaining member,
   - at least one said hinging axis variation device comprising:
   - at least one hinge body having at least one slotted aperture extending therethrough for receiving at least one pivot axle, defining said axis, attached to said second retaining member said pivot axle adapted to move in said slot in a direction perpendicular to said axis; and at least one limiter for limiting the movement of said axle within said slotted aperture wherein said limiter comprises at least one threaded member adapted to engage a receiving threaded portion of said hinge body, said threaded member limiting the movement of the pivot axle within said slotted aperture.

2. An apparatus according to claim 1, wherein at least one said clamping device comprises at least one nut and bolt.

3. An apparatus according to claim 1, further comprising an insert portion adapted to be attached to said first and/or second retaining member between a surface of said retaining portion that engages said cable and a surface of the cable.

4. An apparatus according to claim 3, wherein said insert portion comprises a body for reducing the space between the first and second retaining portions.

5. An apparatus according to claim 3, wherein said insert portion comprises a liner for locating between said first and second retaining members and the cable.

6. An apparatus according to claim 1, wherein said apparatus is adapted to engage three cables arranged in a triangle.

7. An apparatus according to claim 6, wherein said first retaining portion is adapted to engage a single cable and said second retaining member is adapted to engage two other cables.

* * * * *